Feb. 2, 1926. 1,571,413
P. N. C. JAMES
DOUBLE CONTROL OF THE COMBINED TYPE FOR AEROPLANES AND FOR LIKE PURPOSES
Filed May 2, 1924 3 Sheets-Sheet 2
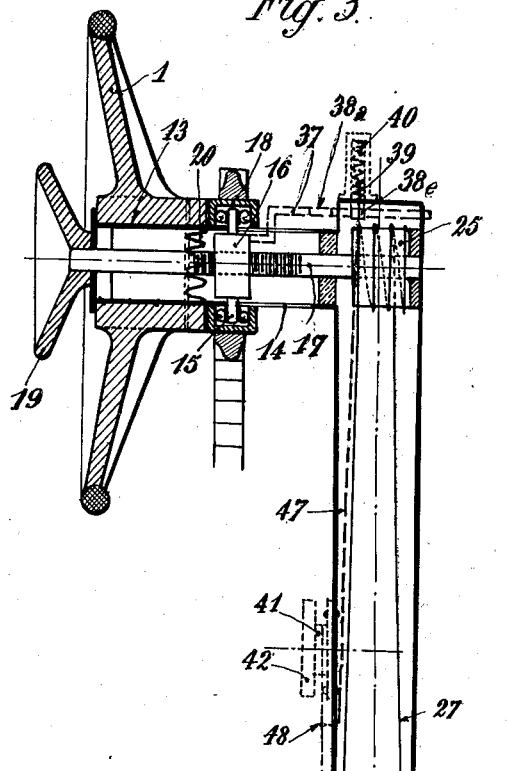
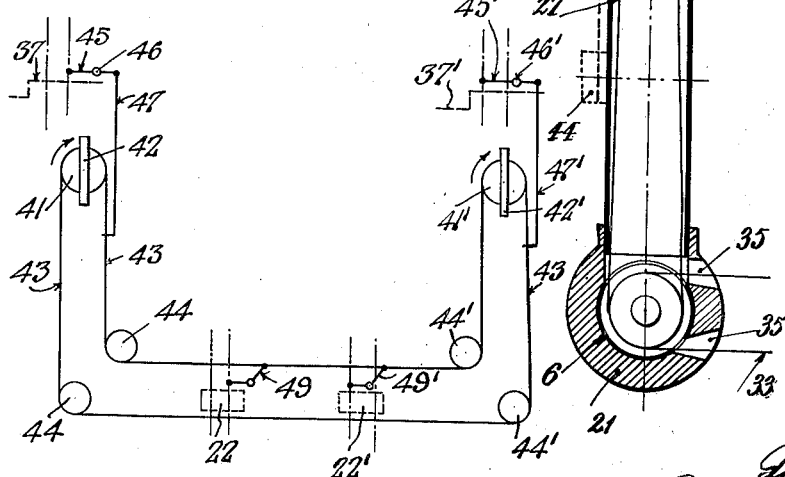

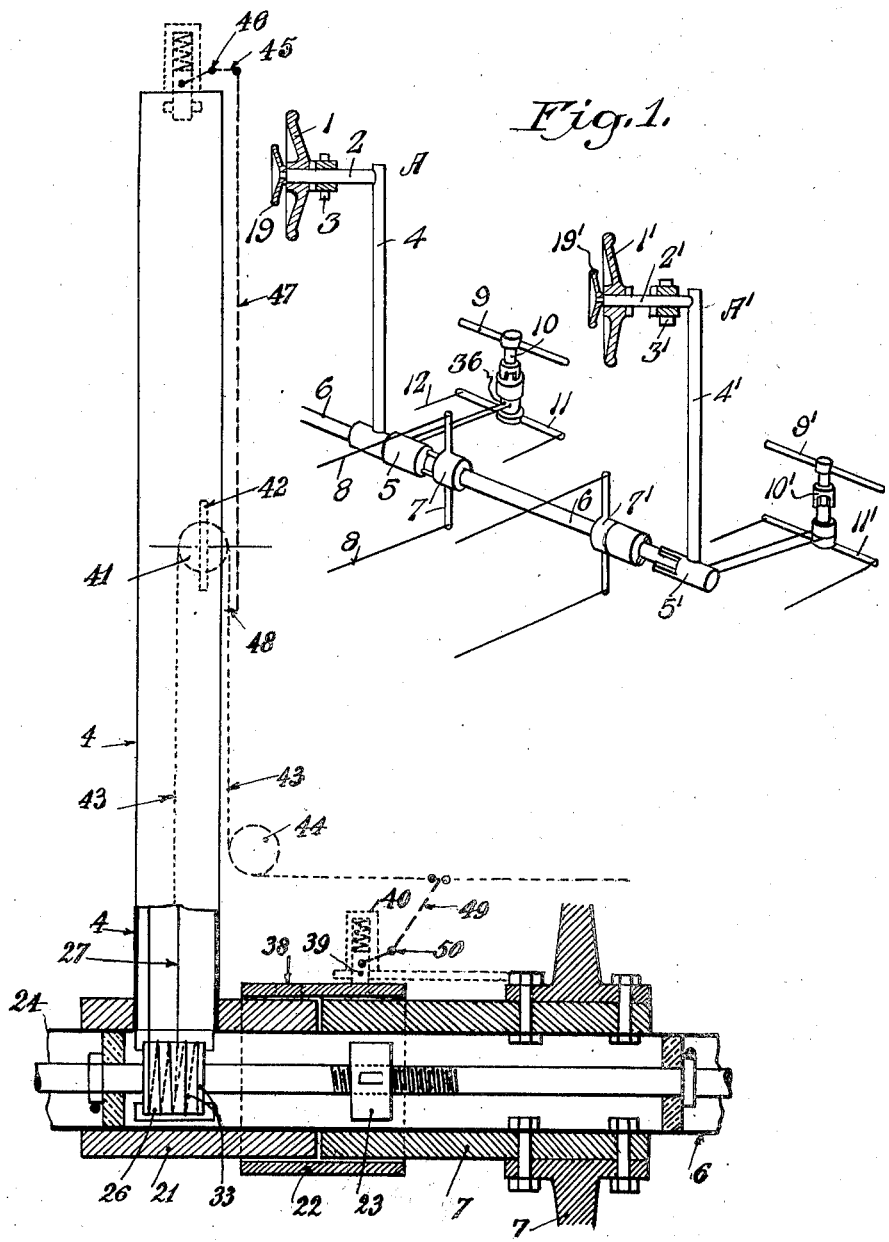

Feb. 2, 1926.  
P. N. C. JAMES  
1,571,413  
DOUBLE CONTROL OF THE COMBINED TYPE FOR AEROPLANES AND FOR LIKE PURPOSES  
Filed May 2, 1924  
3 Sheets-Sheet 3
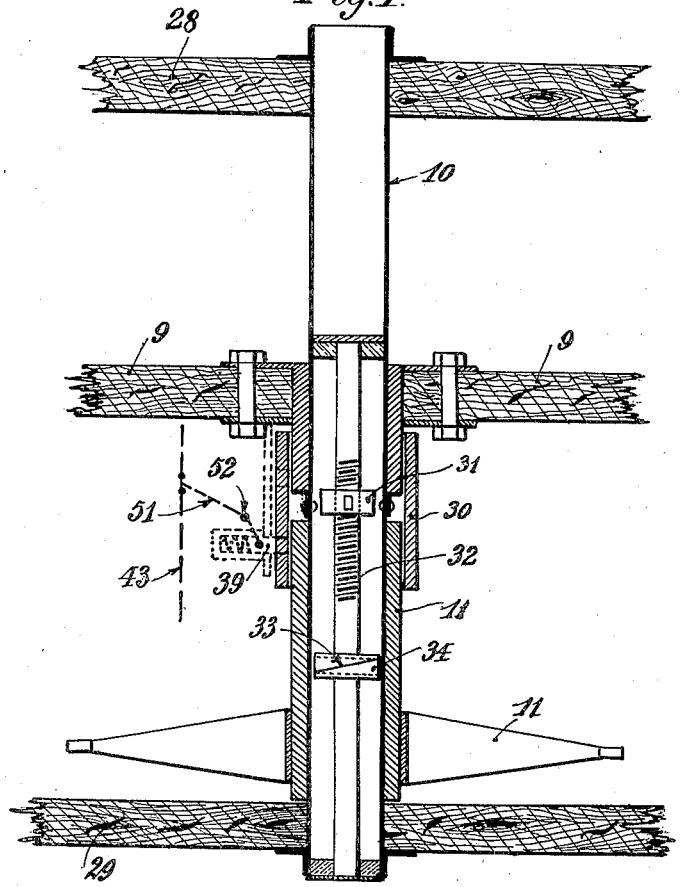
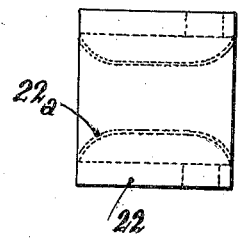

Patented Feb. 2, 1926.

1,571,413

UNITED STATES PATENT OFFICE.

PAUL NICOLAS CLAUDE JAMES, OF PARIS, FRANCE.

DOUBLE CONTROL OF THE COMBINED TYPE FOR AEROPLANES AND FOR LIKE PURPOSES.

Application filed May 2, 1924. Serial No. 710,658.

*To all whom it may concern:*

Be it known that I, PAUL NICOLAS CLAUDE JAMES, a citizen of the French Republic, residing at Paris, in the Department of Seine, France, have invented new and useful Improvements in Double Control of the Combined Type for Aeroplanes and for like Purposes, of which the following is a specification.

It has been recognized for a long time past that it is absolutely necessary to provide in all the multi-seater war airplanes and commercial aeroplanes for passenger transportation, two steering stations which are independent and can be substituted for one another. But the aeroplanes hitherto constructed are provided with devices of a rudimentary and incomplete design, comprising two steering stations which are each occupied by a pilot, which stations perform exactly the same functions; it may happen however, if for example one of the pilots is killed or wounded at his station, that his body will hinder the working of the steering mechanism.

The invention relates to double steering mechanism for airplanes having two interrelated steering stations, said mechanism being clutchable and unclutchable from either one of the steering stations, in such manner that the stopping or the obstruction of the mechanism of one station will not prevent the working by the pilot of the other station.

The invention is essentially characterized in that each of the controlling elements (for example hand wheel for the wing twisting or the operating of the balancing planes, swinging rod for controlling the elevator, and pivoted foot lever for controlling the rudder), is mounted loose and is connected with the corresponding steering mechanism solely through the intermediary of clutching devices; also in that all the clutches of the two stations are connected together by suitable means, and preferably by mechanical means, for instance by levers, shafts, gearing, or preferably by cables, so that when the controlling elements of one station are clutched with their steering mechanisms, the controlling elements of the other station will be unclutched; and further that actuating means for the said cable (or like) connection are provided at each station whereby each pilot can effect the clutching of his own station, and this will at the same time unclutch the controlling elements of the other station.

Another feature of the invention consists in providing, preferably upon each of the clutches, a suitable locking system in order to insure that the position of the complete clutching or unclutching of the said clutch has been attained, and all the locking bolts are herein connected together, for example by a cable connection which is accessible from either steering station.

In this manner, if for any reason the pilot occupying the second station must perform the steering of the airplane, he may simply unbolt the clutches and then operate their connecting means until his own station is completely clutched; whereby the first station will be unclutched and the locking system will be again locked in an automatic manner in its second position.

A suitable means for effecting the simultaneous connection of all the clutches consists for example in the use of clutching sleeves which are movable lengthwise by a nut mounted upon a screw provided at the end with a thrust piece, the several coupling screws of the different steering mechanisms being connected together for instance by an endless cable or system of endless cables disposed upon drums mounted upon the said screws; by actuating the cable or system of cables at either of the stations, all the coupling screws will be turned in such manner that in one station the movable clutch sleeves will be released from their coacting members, whilst in the second station the arrangement will be placed in the engaged position.

The appended drawings show by way of example an embodiment of the said invention.

Fig. 1 is a perspective view showing the arrangement of the clutching devices for the control elements of the three steering mechanisms, i. e. wing twisting or balancing planes, elevator and rudder, at the two pilots' stations. Fig. 2 is a diagrammatic view showing the locking of the said clutches. Fig. 3 is a section on the axis of the hand wheel controlling the balancing planes. Fig. 4 is a vertical section on the axis of the swinging rod for controlling the elevator, and Figs. 5 and 6 show a corresponding detail. Fig. 7 is a section on the axis of the pivoted foot lever for controlling the rudder.

In Fig. 1 in the pilots' station A, 1 is the hand wheel which is rotated to control the balancing planes by means of the chain wheel 3 and a suitable chain connection; the rod 4, which can be swung forward or backward by the said hand wheel, controls the elevator, and for this purpose it turns by means of its hub 5, mounted of the shaft 6, the double arm 7 which operates the elevator by the cables 8; the pivoted foot lever 9 rotates the vertical shaft 10 upon which it is mounted and thus controls the rudder by the arms 11 and the cables 12. The interrelated station A' comprises similar elements, with the use of the common shaft 6.

The invention consists essentially in disposing the chain wheels 3 and 3', the arms 7 and 7' and the arms 11 and 11' upon their shafts in such manner that they will be independent of their respective control elements 1 and 1', 5 and 5', 9 and 9', and in providing suitable clutches between the same which can be disengaged at will, and connecting means between the six clutches of the two steering stations, in such manner that when the three clutches of a given station are in the engaged position, the three clutches of the second station will be in the disengaged position. For example the chain wheels 3 and 3', the hubs 7 and 7' of the elevator control arms, and the hubs of the rudder control arms 11 and 11', are so mounted as to be movable lengthwise upon their shafts 2 and 2', 6, 10 and 10' respectively, and are constructed in such manner as to form claw clutch members cooperating with like claw portions provided on the hand wheels 1 and 1'; and the same is true for the clutch engagement between 5 and 7, 5' and 7' respectively and between 9 and 11, 9' and 11' respectively.

Fig. 3 shows a device of this kind for the hand wheel controlling the balancing planes. The tube 13 upon which the hand wheel 1 is revoluble, comprises the slots 14 in which are movable the studs 15 of a nut 16 cooperating with a screw 17 coaxial with the tube 13; said studs are mounted within two rings cooperating with the internal lateral faces of the body 18 of the chain wheel in such manner as to form a roller path for a thrust ball-bearing, whereby the said chain wheel shall be secured to the said nut and will travel with the same in its axial movement, but is at the same time enabled to rotate on the tube 13, whilst the nut 16 cannot rotate. A small hand wheel 19 keyed to the screw 17 provides for the axial motion of the said nut and the chain wheel 18, and since the latter is provided with teeth 20 cooperating with corresponding teeth provided upon the wheel 1, the small wheel 19 can be used for the engagement or disengagement of the said chain wheel relative to the hand wheel 1.

For the control of the elevator, Figs. 3 and 4, the hub 7 of the double control arm for the elevator is keyed to the tubular shaft 6 whilst the tubular rod 4 is mounted loose by means of its hub 21 upon the shaft 6. A coupling sleeve 22 is connected in a manner analogous to what has been described with a nut 23 cooperating with the screw-threaded rod 24 which is coaxial with the shaft 6; the axial displacement of the sleeve 22 can either engage (as shown) or disengage the hubs 7 and 21 by means of suitable projections or claws, e. g. such as the parts 21$_a$ disposed upon the element 21 Fig. 5, and cooperating with the recesses 22$_a$ in the sleeve 22, Fig. 6. The screws 24 and 17 should have a common control, and for this purpose a cable connection is provided; for instance a drum 25 keyed to the screw shaft 17 is connected with a drum 26 keyed to the shaft 24 by a cable 27 wound upon both drums.

As concerns the control of the rudder, the pivoted foot lever 9 is mounted loose by means of its hub upon the tubular shaft 10 which is mounted in the usual members of the airplane frame 28 and 29. A coupling sleeve 30 is provided in like manner for the clutch coupling of the hub of the foot lever 9 with the hub of the arms 11, said sleeve being actuated by a nut 31 cooperating with a screw 32 which is coaxial with the tube 10 and is rotatably connected with the screw 24 by an endless cable 33 wound upon the drum 26 of the screw and the drum 34 of the screw 32, the two strands of the said cable passing through suitable apertures 35 in the tube 6 and in the sleeve 21 on the one hand and the apertures 36 in the tube 10 and in the hub 11 on the other hand.

Since the same arrangement is employed for the station A', and the screw 24 disposed on the axis of the common tube 6 is also common to the two stations, it is observed that the six clutches are connected together by means of the cable connection and that they may be all actuated together either by the hand wheel 19 of the station A or by the hand wheel 19' of the station A'; care must be taken that the relative setting shall be such that when the clutches of one station are engaged, the clutches of the other station are disengaged, except during a short period of transition during which the two stations are to be engaged at the same time, in order that the airplane shall not remain without control.

The locking is carried out in the following manner.

For use with the chain controlling the balancing planes, the nut 16 is provided with a plate 37 pierced with the two apertures 38ₐ 38_c which in the respective positions of complete unclutching or complete clutching will be situated below a locking bolt 39 urged by a spring 40 in such manner that when the chain wheel attains either of these positions the locking will be automatically effected. Like conditions prevail for the control of the elevator and the control of the rudder by the use of like spring bolts (indicated also by 39 and 40) cooperating with the apertures 38 in the sleeves 22 and 30.

In either station, one must be enabled to unbolt at the locking bolts at will in a simultaneous manner before proceeding with the reversal of the clutchings of the steering mechanisms. Cables can also be used to connect all the locking bolts together. The figures represent a drum 41 mounted for instance upon the tube 4, which is operated by the head 42 and upon which is wound the cable 43; by means of suitable supporting pulleys 44, or like devices, the said cable connects together the actuating means for the locking bolts 39. For instance the bolt of the chain wheel 18 is connected with the cable 43 by a lever 45 pivoting on a fixed axle 46 and actuated by a rod 47 which is connected at 48 with the cable 43; the bolt of the sleeve 22 is actuated by a lever 49 pivoted at the fixed point 50; the bolt of the sleeve 30 is actuated by a lever 51 pivoting at the fixed point 52.

The cable 43 may be actuated by either pilot by means of the projections 42, 42'. By observing the position of the projection 42, the pilot occupying a given station can ascertain whether the clutches have been locked or not, i. e. whether the controlling elements have been fully engaged or are entirely disengaged; each pilot can also observe from the position of the coupling sleeves whether his station is clutched or unclutched.

Obviously, the above-mentioned forms of construction are susceptible of a wide range of variations without departing from the spirit of the invention.

I claim:

1. An inter-related double steering device for airplanes having two inter-related steering stations, comprising: for each station control elements whereof each is mounted loose with respect to the corresponding steering mechanism, together with a clutching device for clutching the said control element with the said steering mechanism and disengaging the same; means connecting together all of the said clutching devices of the two stations and so disposed that in the clutched position of the clutches of a given station, the clutches of the other station shall be in the unclutched position; and actuating means provided at each station for actuating the said connecting means from either of the stations at will, in order to effect the clutching of the clutches of the said station.

2. An inter-related double steering device for airplanes having two inter-related steering stations comprising: for each station, control elements whereof each is mounted loose with respect to the corresponding steering mechanism, together with a clutching device for clutching the said control element with the said steering mechanism and disengaging the same; means connecting together all the clutching devices of the two stations and so disposed that in the clutched position of the clutches of a given station, the clutches of the other station shall be in the unclutched position; actuating means provided at each station for actuating the said connecting means from either of the stations at will in order to effect the clutching of the clutches of the said station; and locking means for locking the said clutches in the clutched and the unclutched position; a connection for connecting together all of the said locking means; and actuating means for actuating the said connection and provided at each of the said stations.

3. An inter-related double steering device for airplanes having two inter-related steering stations comprising: for each station, control elements whereof each is mounted loose with respect to the corresponding steering mechanism, together with a clutching device for clutching the said control element with the said steering mechanism and disengaging the same; means connecting together all the clutching devices of the two stations and so disposed that in the clutched position of the clutches of a given station, the clutches of the other station shall be in the unclutched position; actuating means provided at each station for actuating from either of the stations the said connecting means, in order to effect the clutching of the clutches of the said station; and locking means for locking the said clutches in the clutched and the unclutched position; a connection for connecting together all of the said locking means, and actuating means for actuating the said connection and provided at each of the said stations; and a device visible by the pilot of each station and indicating at each instant the condition of the said locking means and the state of the clutches.

4. An inter-related double steering device for airplanes having two inter-related steering stations comprising: for each station, control elements whereof each is mounted loose with respect to the corresponding steering mechanism, together with a clutching device for clutching the said control element with the said steering mechanism and disengaging the same; connecting cables for connecting together all the clutching devices of the two stations and so disposed that in the clutched position of the clutches of a given station, the clutches of the other station shall be in the unclutched position; and actuating means provided at each station for actuating the said cables from either of the stations at will, in order to effect the clutching of the clutches of the said station.

5. An inter-related double steering device for airplanes having two inter-related steering stations comprising: for each station, control elements consisting of a hand wheel for the wing twisting or the operation of the balancing planes, a revoluble hub on a swinging rod for controlling the elevator, and a revoluble hub on a pivoted foot lever for controlling the rudder whereof each element is mounted loose on a revoluble shaft, a claw clutch sleeve upon each revoluble shaft participating in the rotation of the corresponding steering mechanism and axially slidable by means of a nut disposed upon an axial screw serving as an end thrust member, for clutching the steering mechanism with its control element and for disengaging the same, cables wound upon the shafts of the said screws whereby all of the said screws are connected with both stations, thus insuring for the claw clutch sleeves of a given station the positions corresponding to their clutching with the said control elements, and for the claw clutch sleeves of the other station the positions corresponding to the unclutching, and means for rotating the said screws together from either of the said stations.

6. An inter-related double steering device for airplanes having two inter-related steering stations comprising: for each station, control elements consisting of a hand wheel for the wing twisting on the operation of the balancing planes, a revoluble hub on a swinging rod for controlling an elevator, and a revoluble hub on a pivoted foot lever for controlling the rudder whereof each element is mounted loose on a revoluble shaft, a claw clutch sleeve upon each revoluble shaft participating in the rotation of the corresponding steering mechanism and axially slidable by means of a nut disposed upon an axial screw serving as an end thrust member for clutching the steering mechanism with its control element and for disengaging the same, cables wound upon the shafts of the said screws whereby all of the said screws are connected with both stations, thus insuring for the claw clutch sleeves of a given station the positions corresponding to their clutch engagement with the said control elements, and for the claw clutch sleeves of the other station the positions corresponding to the unclutching, and means for rotating the said screws together from either of the said stations, in cooperation with the said clutch sleeve, a locking bolt for locking the said sleeve in one or the other of its positions wherein it is entirely clutched or entirely unclutched, a cable connection between all the locking bolts of the two stations, thus ensuring for all the locking bolts of a given station the position corresponding to the clutching of the said sleeve, and for all the locking bolts of the other station the position corresponding to the unclutching of the same, and in each station, means for actuating at will the said cable connection.

In testimony whereof I have hereunto set my hand.

PAUL NICOLAS CLAUDE JAMES.